United States Patent
Kim

[11] Patent Number: 6,126,214
[45] Date of Patent: Oct. 3, 2000

[54] AIR BUMPER

[76] Inventor: Sun Young Kim, 413 Cashmere Dr., Garland, Tex. 75041

[21] Appl. No.: 09/360,280

[22] Filed: Jul. 26, 1999

[51] Int. Cl.$^7$ ..................................................... B60R 19/20
[52] U.S. Cl. ............................................. 293/107; 251/76
[58] Field of Search .................................... 293/107, 109, 293/110, 132, 134; 251/76; 137/467

[56] References Cited

U.S. PATENT DOCUMENTS

| | | |
|---|---|---|
| 3,792,890 | 2/1974 | Corretti . |
| 3,823,969 | 7/1974 | Sapper et al. . |
| 3,837,695 | 9/1974 | Haase et al. . |
| 3,961,818 | 6/1976 | Roth, Jr. . |
| 4,050,689 | 9/1977 | Barton et al. . |
| 4,190,129 | 2/1980 | Mary ........................................ 180/119 |
| 4,215,878 | 8/1980 | Hirbod .................................... 280/737 |
| 4,352,514 | 10/1982 | Orima ..................................... 293/110 |
| 4,995,659 | 2/1991 | Park ......................................... 293/107 |
| 5,042,859 | 8/1991 | Zhang et al. ............................ 293/107 |
| 5,106,137 | 4/1992 | Curtis ...................................... 293/107 |
| 5,431,463 | 7/1995 | Chou ....................................... 293/107 |

FOREIGN PATENT DOCUMENTS

| | | | |
|---|---|---|---|
| 2270123 | 1/1976 | France ................................... | 293/110 |
| 2684624 | 6/1993 | France ................................... | 293/107 |

*Primary Examiner*—Dennis H. Pedder
*Attorney, Agent, or Firm*—Mark W. Handley

[57] ABSTRACT

A bumper has a bumper frame and an inflatable bladder, which is mounted to the bumper frame to extend exteriorly of the bumper frame. Fluid flow ports extend from the inflatable bladder, in fluid communication with the interior of the inflatable bladder. Inlet valves and pressure relief valves are mounted in the flow ports for sealing air within the inflatable bladder. Two impact members are mounted to the bumper frame, extending outwardly from the bumper frame and interiorly within the inflatable bladder. The impact members are connected to respective ones of the pressure relief valves, such that inward movement of the impact members will open the pressure relief valves to allow fluid flow from within the inflatable bladder. Latch members are located adjacent to the pressure relief valves for securing the valves in open positions after impact. An activator stem is secured adjacent to an inward end of a stem of one of the pressure relief valves, and is moved inward of the bumper frame by contact with the stem of the pressure relief valve during an impact. A pressure relief valve is also provided which includes a plug member having a plurality of seal grooves for receiving elastomeric seal elements, the number of grooves which are used being selected to determine a maximum pressure for release of the plug member from within a flow port. The plug member is secured to the flow port by a tether member.

22 Claims, 6 Drawing Sheets

AIR BUMPER

BACKGROUND OF THE INVENTION

Prior art bumpers have been used for both moving vehicles, and on stationary guards and guardrails, for absorbing shock and the impact from collisions to prevent injury to persons and damage to property. Such bumpers have included metal frame members, some of which have resilient members such as springs and elastomeric materials for absorbing shock. Other bumpers have included inflatable bladders, usually allowing air to flow from within the inflatable bladders upon impact. During high energy collisions, the inflatable bladders will usually undergo dramatic increases in pressure until a maximum pressure is exceeded, at which point the fluid pressure of the air within the inflatable bladders is released, often allowing air to be expelled from within the inflatable bladders.

Some prior art air bumpers are self-inflating after impact, having resilient members which will rebound after impact to cause the inflatable bladders to reinflate. Self-inflating prior art air bumpers have been provided which restrict the air flow back into the inflatable bladders, preventing shock from rapid rebounding of the resilient members. Other bumpers allow users to simply inject more air within the inflatable bladders to reinflate such bladders after an impact. However, a violent impact may damage components of such air bumpers, so that although the bumper may appear to be in proper working order, servicing and repair is required. Unlike conventional steel component bumpers which exhibit clearly visible indications of deterioration or damage after impact, air bumpers which may be reinflated by users without inspection after an impact, or which are self inflating after impact, may allow reinflation with damaged components without the user being aware of the deteriorated condition of such bumpers components.

SUMMARY OF THE INVENTION

A bumper is provided having a bumper frame for securing to an automobile frame, a stationary guardrail, or the like. An inflatable bladder is mounted to the bumper frame to extend exteriorly of the bumper frame. Fluid flow ports extend from the inflatable bladder, in fluid communication with the interior of the inflatable bladder. Inlet valves and pressure relief valves are mounted in the flow ports for sealing air within the inflatable bladder. Two impact members are mounted to the bumper frame, extending outwardly from the bumper frame and interiorly within the inflatable bladder. The impact members are connected to respective ones of the pressure relief valves, such that inward movement of the impact members will open the pressure relief valves to allow fluid flow from within the inflatable bladder. Latch members are located adjacent to the pressure relief valves for securing the valves in open positions after impact. An activator stem is secured adjacent to an inward end of a stem of one of the pressure relief valves, and is moved inward of the bumper frame by contact with the stem of the pressure relief valve during an impact. A pressure relief valve is also provided which includes a plug member having a plurality of seal grooves for receiving elastomeric seal elements, the number of grooves which are used being selected to determine a maximum pressure for release of the plug member from within a flow port. The plug member is secured to the flow port by a tether member.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
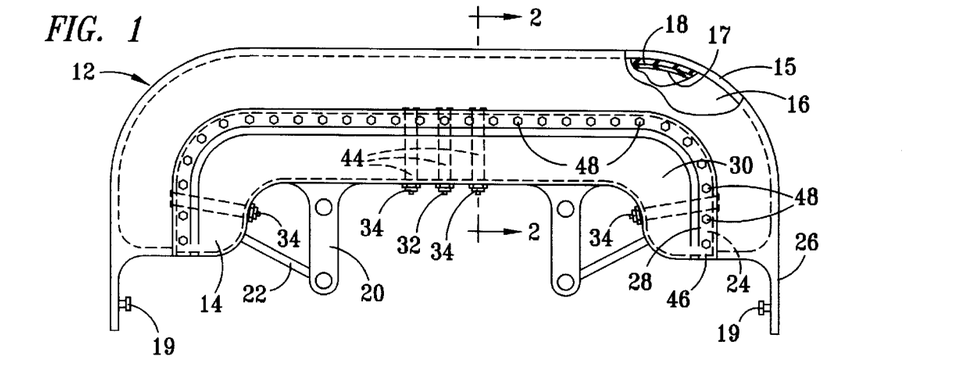
FIG. 1 is a top view of an air bumper made according to the present invention.

FIG. 1 is a top view of an air bumper 12 made according to the present invention. The air bumper 12 has a bumper frame 14 and an outer bladder member 15 which are secured together in a sealing engagement to together define an inflatable, fluid bladder 16. The outer bladder member 15 defines an outward bladder portion of the inflatable bladder 16, with a fluid chamber 17 of said bladder defined between said bumper frame and said outer bladder member 15. Preferably, the inflatable bladder includes a tube 18, within which the fluid chamber 17 is disposed. The inflatable bladder 16 is secured to extend exteriorly the bumper frame 14, wherein at least a portion of the inflatable fluid bladder 16 extends outward of the bumper frame 14. Attachment fittings 19, support brackets 20 and support arms 22 are provided for mounting the bumper frame 14 to an automobile frame. The bladder member 15 is preferably formed of elastomeric materials, such as a composite steel belted rubber product, similar to that from which belted tires are made. The bladder member 15 includes an inner mounting ear 24 and an outward mounting ear 26, for mounting the bladder member 15 to the bumper frame 14 and an automobile frame, respectively. A mounting bracket 28 is provided for securing the inward end of the outer bladder member 15 to the frame assembly 30, which includes the bumper frame 14 and the mounting bracket 28. Fluid inlet valves 32 are provided for passing fluid, preferably a compressible fluid, such as air, into the fluid chamber 17 to inflate the inflatable bladder 16, and high pressure relief valves 34 are provided for releasing air from within the fluid chamber 17 of the inflatable bladder 16 at high pressures which occur during the impact of a collision.

Figures 2, 3, 4, 5:
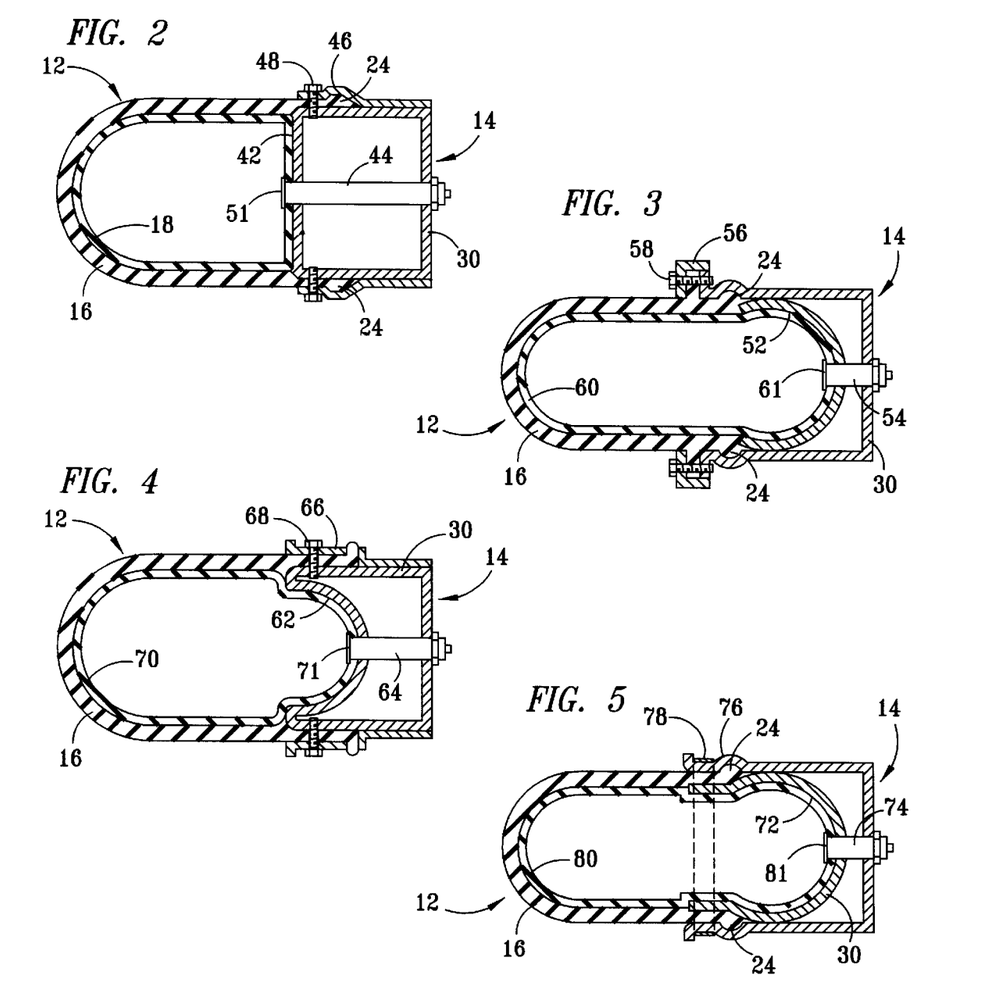
FIG. 2 is a sectional view of the air bumper, taken along section line 2—2 of FIG. 1, and disclosing a first configuration for mounting an inflatable bladder to a bumper frame of the air bumper.
FIG. 3 is a sectional view of the air bumper, taken along section line 2—2 of FIG. 1, and discloses a second configuration for mounting the inflatable bladder to the bumper frame.
FIG. 4 is a sectional view of the air bumper, taken along section line 2—2 of FIG. 1, and discloses a third configuration for mounting the inflatable bladder to the bumper frame.
FIG. 5 is a sectional view of the air bumper, taken along section line 2—2 of FIG. 1, and depicts a fourth configuration for mounting the inflatable bladder to the bumper frame.

FIG. 2 is a sectional view of the air bumper 12, taken along section line 2—2 of FIG. 1, and showing a first configuration for mounting the inflatable bladder 16 to the bumper frame 14. The frame assembly 30 of the bumper frame 14 has a planer forward face 42. A flow port is defined by a flow tube 44 extends through the planer face 42, and rearward to the rearward end of the bumper frame 14. A mounting bracket 46 secures the outward sides of the inner mounting ears 24 of the outer bladder member 15 to the bumper frame 14. Fasteners 48 secure the mounting bracket 46 to the bumper frame 14. The tube 18 extends within the periphery of the forward face 42 of the bumper frame 14 and the inner surface of the outer bladder member 15. A seal member 51 seals the tube 18 around the forward end of the flow tube 44 at the planar face 42.

FIG. 3 is a sectional view of the air bumper 12, taken along section line 2—2 of FIG. 1, and showing a second configuration for securing the inflatable bladder 16 to the bumper frame 14. The bumper frame 14 has an arcuately shaped forward face 52, providing a concave surface which defines a sealed chamber with the interior surface of the outer bladder member 15. A flow port is defined by a flow tube 54 which extends through the forward face 52 and rearward to the exterior of the bumper frame 14. Two mounting brackets 56 secure the inner mounting ears 24 of the outer bladder member 15 to the bumper frame 14. Fasteners 58 are provided for securing the mounting bracket 46 to the bumper frame 14. A tube 60 extends within the periphery of the forward face 52 of the bumper frame 14 and the inner surface of the outer bladder member 15. A seal member 61 seals the tube 60 around the forward end of the flow tube 54 at the planar face 52.

FIG. 4 is a sectional view of the air bumper 14, taken along section line 2—2 of FIG. 1, and showing a third configuration for securing the inflatable bladder 16 to the bumper frame 14. The bumper frame 14 is shown having an arcuately shaped forward face 62, which defines a concave surface. A flow port is defined by a flow tube 64 which extends through the forward face 62 to the rearward end of the bumper frame 14 to provide a fluid flow passage for releasing air from within the interior of the inflatable bladder 16 to atmosphere. Two mounting brackets 66 secure the two inner mounting ears 24 of the outer bladder member 15 to the forward end of the bumper frame 14. Fasteners 68 are used to securing the mounting bracket 66 to the bumper frame 14. A tube 70 extends within the periphery of the forward face 62 of the bumper frame 14 and the inner surface of the outer bladder member 15. A seal member 71 seals the tube 70 around the forward end of the flow tube 64 at the planar face 62.

FIG. 5 is a sectional view of the air bumper 12, taken along section line 2—2 of FIG. 1, and showing a fourth configuration for securing the inflatable bladder 16 to the bumper frame 14. A forward base 72 of the bumper frame 14 is defined as an arcuate surface. A flow port is defined by a flow tube 74 which extends through the forward face 72 into the inward end of bumper frame 14. The mounting brackets 76 secure the two inner mounting ears 24 of the outer bladder member 15 to the forward end of the bumper frame 14. Fasteners 78 are provided for securing the mounting brackets 76 to the bumper frame 14. A tube 80 extends within the periphery of the forward face 72 of the bumper frame 14 and the inner surface of the outer bladder member 15. A seal member 81 seals the tube 18 around the forward end of the flow tube 74 at the planar face 72.

Figure 6:
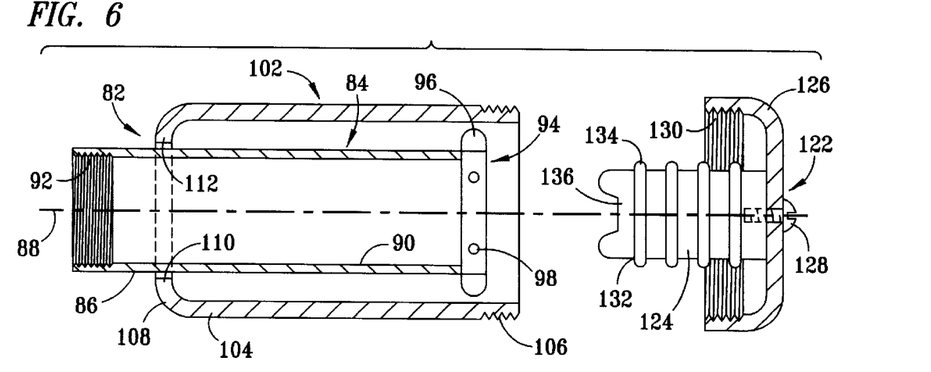
FIG. 6 is a partially exploded, longitudinal section view of a first pressure relief valve for use with the air bumper.

FIG. 6 is a partially exploded, longitudinal section view of a first pressure relief valve 82 used for one of the valves 34 of the air bumper 12. The pressure release valve 82 is preferably mounted to one of the flow tubes, such as flow tube 44, which extends through the bumper frame 14. The pressure relief valve 82 includes a flow tube 84, which provides a mandrel for assembling the other components of the pressure relief valve 82 thereto. The flow tube 84 has a tubular body 86 having a central axis 88 and an interior inner flow passage 90. The flow tube 84 has a threaded forward end 82 for threadingly securing to one of the flow tubes 44 of the bumper frame 14 of the air bumper 12. A retainer member 94 is mounted to the rearward end of the flow tube 84 and the member 94 includes a protuberant, annular-shaped ear portion which protrudes radially outward from the tubular body 16 of the flow tube 84. The retainer member 94 is secured to the inward end of the flow tube 84 by mechanical fasteners 98.

The pressure relief valve 82 further includes a tether sleeve 102 having a tubular body 104 and a threaded rearward end 106. The forward end 108 inwardly protrudes to define an annular-shaped dog 110 having an inwardly disposed annular face 112 which is slidingly disposed upon the exterior surface of the flow tube 84. The interior diameter of the inward annular-shaped face 112 is sized such that it will be retained upon the rearward end of the flow tube 84 by the protuberant annular-shaped ears 96 of the retainer member 94.

The pressure relief valve 82 also includes a plug 122. The plug 122 has a main body 124 and an inward cap 126. A threaded fastener 128 secures the cap 126 to the main body 124. The main body 124 is sized such that it will fit within the flow passage 90 of the flow tube 84, in a sliding engagement. The forward end of the cap 126 has threads 130 for engaging with the threaded rearward end 106 of the tether sleeve 102 to threadingly secure the plug 122 to the tether sleeve 102. A plurality, preferably four, seal grooves 132 are formed into the main body 124 of the plug 122 to circumferentially extend about the main body 124, centrally disposed around a central axis of the plug 122. The seal grooves 132 of the main body 124 of the plug 122, together with the surface of the fluid flow passage 90 of the flow tube 84, define seal glands for receiving the seal elements 134 in sealing engagement therewith. Preferably, the seal elements 134 are provided by elastomeric O-rings. The forward end of the main body 124 preferably has a concave surface which defines a plug face 136. The plug face 136 is concave. Pressure within the flow tube 84 will urge the plug 122 from within the flow tube 84 when high pressures are encountered, such that the high pressures will be released from within the inflatable bladder 16 of the air bumper 12. The O-rings for the seal elements 134 are sized and selected to provide a frictional engagement with the surface of the fluid flow passage 90 for determining the pressure at which the plug 122 will be ejected from within the flow tube 84. Additionally, the number of the seal elements 134 which are utilized around the main body 124 may be selected to be a number less than four, or a number greater than four, for determining the magnitude of the frictional engagement with the surface of the fluid flow passage 90, such that the high pressure at which the plug 122 will be ejected from within the flow tube 84 of the pressure release valve 82 is determined. The tether sleeve 102 will secure the plug 122 to the end of the flow tube 84, in cooperative relation with the retainer member 94, when the plug 122 is ejected from with the flow tube 84 by high pressures within the inflatable bladder 16.

Figure 7:
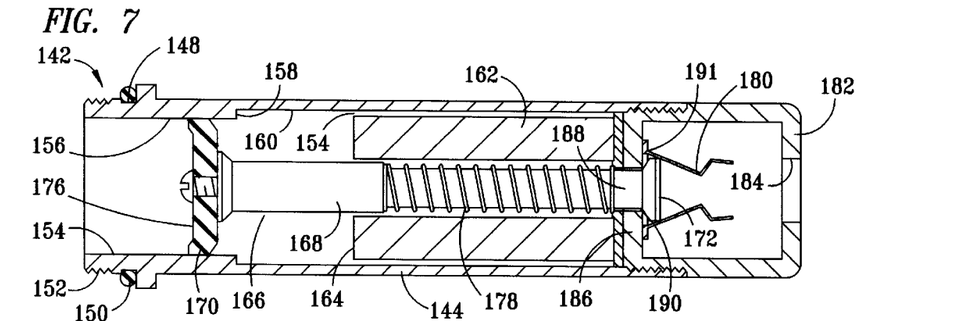
FIG. 7 is a longitudinal section view of a second pressure relief valve for use with the air bumper, shown in an unactuated state for sealing air within the air bumper.
Figure 8:
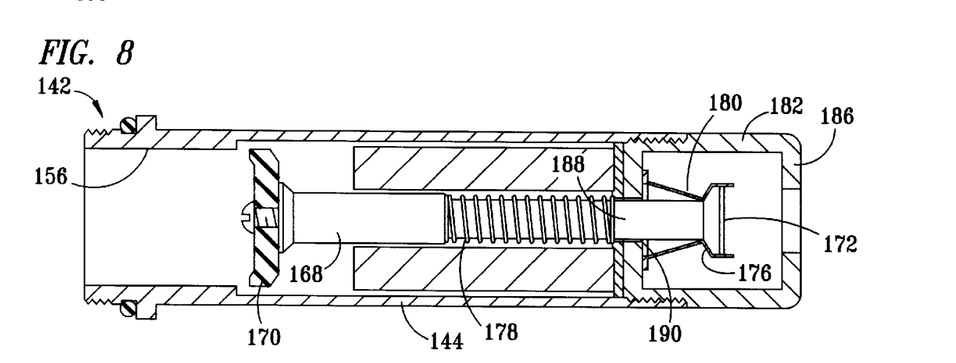
FIG. 8 is a longitudinal section view of the second pressure relief valve, shown in an actuated state, such that pressure is released from within the inflatable bladder.

FIGS. 7 and 8 are sectional views of a second pressure relief valve 142, with FIG. 7 showing the pressure relief valve 142 in an unactuated state, sealing air within the inflatable bladder 16 of the air bumper 12, and FIG. 8 showing the pressure release valve 142 after actuation to release air from within the inflatable bladder 16 of the air bumper 12. The pressure release valve 142 has a flow tube 144 having a forward end 146. The forward end 146 of the flow tube 144 is secured to the bumper frame 14 of the air bumper 12. A forward seal surface 148 is provided on the forward end 146 and a seal member 150 sealingly engages between the seal surface 148 and the bumper frame 14. Preferably, the seal member 150 is provided by an elastomeric O-ring. An alignment ring 152 is defined by a forward end 146, for aligning the flow tube 144 with the fluid passage 44 of the bumper frame 14. A flow passage 154 is defined to extend through the flow tube 144. A seal surface 156 is defined by the forward portion of flow passage 154 and an enlarged diameter portion 160 is defined adjacent to the seal surface 156, with a rearward facing shoulder 158 defined therebetween. A guide sleeve 162 is disposed within the enlarged diameter portion 160. The guide sleeve 162 has a forward facing shoulder 164, which is spaced apart from the rearward facing shoulder 158 such that a section of the enlarged diameter portion 160 is defined as a fluid bypass section of the flow tube 144. A seal assembly 166 includes a stem 168. A forward seal member 170 sealingly engages within the seal surface 156. Actuation of the valve 142 moves the stem 168 rearward from within seal surface 156 and into the enlarged diameter portion 160, within which the fluid flow will bypass between the enlarged diameter portion 160 and the forward seal member 170. The forward end of the seal member 170 has a concave profile. A bias member 178 is provided by a coil spring, which urges the stem 168 to move into a forward position within the seal surface 156.

A latch clip 180 extends around a rearward seal surface 190 and provides a retaining member for securing the stem 168 in a rearward position, such that the rearward seal member 172 is retained in a position which is spaced apart from the seal surface 190, and the forward seal member 170 is disposed within the enlarged diameter portion 160 of the flow tube 142, allowing air to bypass both the forward seal member 170 and the rearward seal member 172. The rearward end of the flow tube 144 includes a shroud 182 which encloses the latch clip 180 to prevent damage thereto. The shroud 182 has a fluid flow opening 184. An end fitting 186 is secured to the rearward end of the flow tube 144, and defines a flow port 188 having the seal surface 190. A conically-shaped forward face 191 of the rearward seal member 172 sealingly engages the seal surface 190 of the flow port 188, when the stem 168 is biased to a forward position by the bias member 178.

Figure 9:
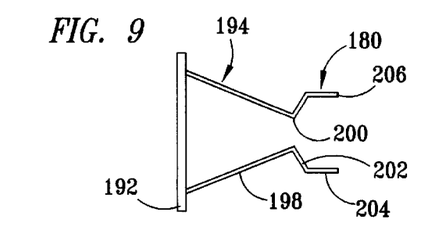
FIG. 9 is a side view of a latch clip of the second pressure relief valve.
Figure 10:
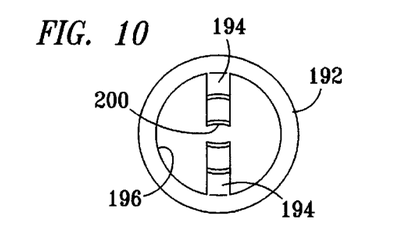
FIG. 10 is an end view of the latch clip.

FIGS. 9 and 10 are a side view and an end view of the latch clip 180, respectively. The latch clip 180 includes an annular-shaped base 190 which is mounted to an end fitting 186 and the flow tube 144. Two spring arms 194 extend outward from the base 192 in an oppositely disposed alignment, and extend inward toward opposing ones of the spring arms 194. A hole 196 is defined by and extends through the arcuately-shaped base. The spring arms 194 have a first portion which extend inwardly to reduced clearance portions 200, and then extend outwardly to outward arm portions 202. The outward portions 202 then extend to rearward retaining portions 204. The ends of the retaining portions 204 define tips 206 of the spring arms 194. The hole 200 is sized such that the rearward seal member 172 will pass through the hole 200 and be retained by the outwardly extending arm portions 202 of the spring arms 194. The inwardly extending arm portions 198 of the forward end of the latch clip 180 retains the forward seal member 172 and the stem 168 in a forward position until a maximum pressure is encountered to overcome both the force of the bias member 178 and the inwardly extending portions 198 of the spring arms 194 of the latch clip 180. Once the stem 168 is moved rearward by pressure acting on the forward face 176 of the forward seal member 170, such that the stem 168 is moved from the unactuated position shown in FIG. 7 to the actuated position of shown in FIG. 8, the retaining clip 180 will retain the rearward seal member 172 in a rearwardly disposed state until an operator inspecting the air bumper 12 will move the end tips 206 outward to spread the arms 198, 202 and 204 outward to release the seal member 172 to move forward with the stem 168 to the non-actuated position of FIG. 7, sealing air within the inflatable bladder 16. The seal member 170 will also move forward with the stem 168, to sealingly engage the seal surface 156 of the flow tube 144.

Figure 11:
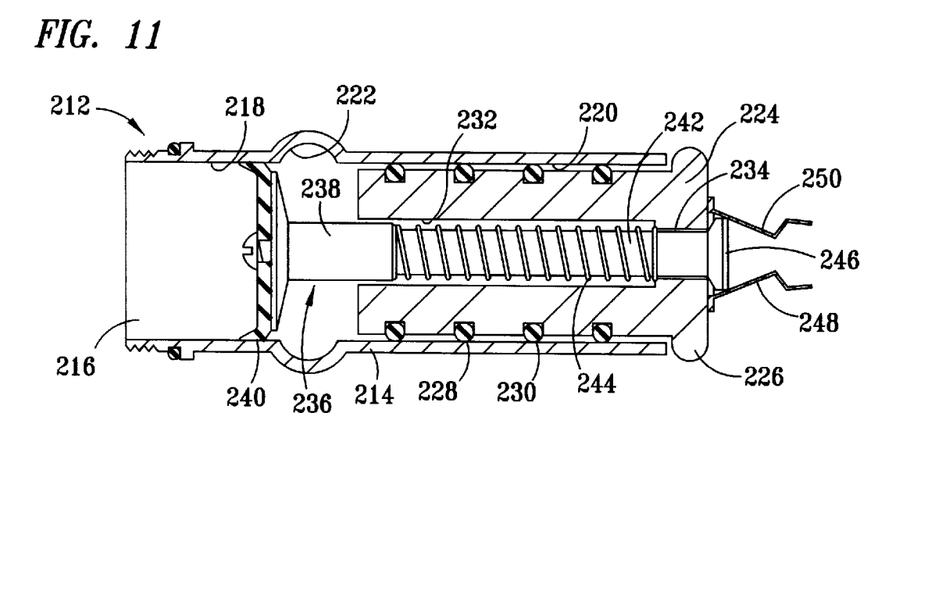
FIG. 11 is a longitudinal section view of a third pressure relief valve, shown in an unactuated state, sealing air within the inflatable bladder.
Figure 12:
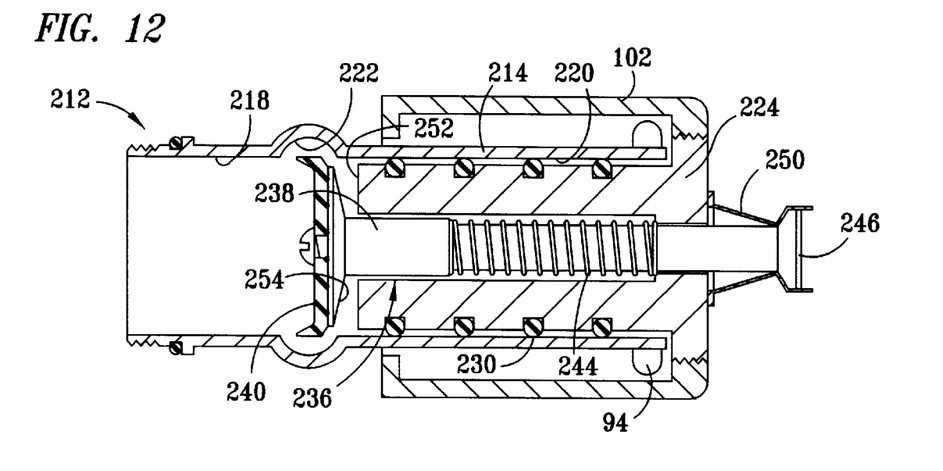
FIG. 12 is a longitudinal section view of the third pressure relief valve, shown in an actuated state, allowing pressure to be released from within the inflatable bladder.

FIGS. 11 and 12 are longitudinal section views of a third pressure relief valve 212. The pressure relief valve 212 includes a flow tube 214 having a threaded forward end 216. The threaded forward end 216 of the flow tube 214 is secured to a bumper frame 14. The flow tube 214 has a forward seal surface 218 and a rearward seal surface 220. An enlarged diameter section 222 provides a fluid flow bypass which extends between the forward seal surface 218 and the rearward seal surface 220. A plug member 224 is mounted in the rearward end of tube 214, within the rearward seal surface 220. The annular shoulder 226 provides a stop to determine the distance from which the plug member 224 is inserted within the rearward seal surface 220 of the flow tube 214. Four grooves 228 are formed into the exterior surface of the plug member 224 to define glands for receiving seal members 230. Preferably, the seal members 230 are provided by elastomeric O-rings. The tether sleeve 102 and the threaded cap 122 may be mounted to the plug member 224 to tether the plug member 224 to the flow tube 214, as shown in FIG. 12. However, a through-hole would then be provided in the cap 126 for passage of the seal 246 and the latch clip 250. Internal threads may be provided on the rearward end of the tether sleeve 102, and the outward ends of the annular shoulders 226 may be threaded for coupling the plug 224 to the tether sleeve 102. The retainer member 94 would also preferably be mounted to the exterior of the flow tube 214 such that when the plug 224 is ejected from within the flow tube 214, the plug will remain tethered to the flow tube 214.

Flow passages 232 and 234 extend interiorly within the plug member 224. A seal assembly 236 extends through the flow tube 214 and the plug member 224. The seal assembly 236 includes a stem 238. A seal member 240 is mounted to the forward end of the stem 238. The stem 238 also includes a shank 242 around which a bias member 244 is mounted. Preferably, the bias member 244 is provided by a coil spring. A rearward seal member 246 is mounted on the rearward end of the shank 242. The seal member 246 engages a seal surface 248 defined on the end of the plug member 224, adjacent the rearward end of the flow passage 234. A latch clip 250 is mounted to the rearward end of the plug member 224, which is similar to the latch clip 180 shown above in FIGS. 9 and 10. The latch clip 250 provides a retaining member which is mounted to the plug member 224 with the base 192 disposed to align the hole 196 with the seal surface 248 and the flow passage 234. A shoulder 252 is defined in the forward end of the plug member 224, and a rearward facing shoulder 254 is defined on the forward portion of the seal assembly 236. The shoulder 252 will engage the shoulder 254 such that the stem 238 will only move rearward a selected distance in response to pressure from within the inflatable bladder 16. Higher pressures will cause the plug member 224 to be ejected from within the flow tube 214, as determined by the frictional engagement between the seal members 230 and the seal surface 220. The frictional engagement between the seals members 230 and the seal surface 220 is preferably selected by selecting the number of and size of O-rings used for the seal members 230. Prior to ejecting of the plug 224 from within the flow tube 214, an intermediate pressure, as determined by the bias member 244, will urge the seal assembly 236 rearward against the force of the bias member 244 until the seal member 246 is engaged by the latch clip 250, and the forward seal member 240 is moved from engaging the forward seal surface 218, such that air will be released from within the inflatable bladder 16. With the stem 238 moved to the rearward position, the pressure relief valve 212 is in an actuated state and fluid will bypass around the enlarged diameter portion 222 and the forward seal member 240, and then through the fluid passage 232 and 234, and between the seal surface 248 and the seal member 246. If a maximum pressure is exceeded, the plug 224 will be ejected from within the flow tube 214. If a tether assembly is used, such as the tether sleeve 102 shown in FIG. 12, the plug 224 will be secured to the flow tube 214.

Figure 13:
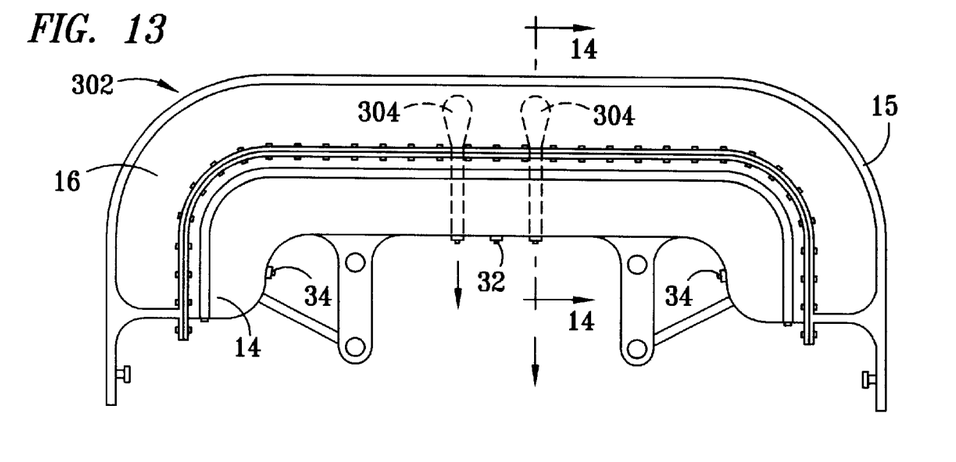
FIG. 13 is a sectional view of a second air bumper of the present invention, taken along a horizontal section plane.

FIG. 13 is a sectional view of a second air bumper 302, taken along a horizontal section plane. The air bumper 302 has an outer bladder member 15 which is mounted to the bumper frame 14 to define an inflatable fluid bladder 16 having a fluid chamber 17. Two impact release units 304 are mounted to the bumper frame 14 and extend interiorly within the inflatable bladder 16. On impact, the impact release units 304 are contacted by the outer bladder member 15 and moved rearward, to open pressure relief valves such that pressure will be released from within the inflatable bladder 16.

Figure 14:
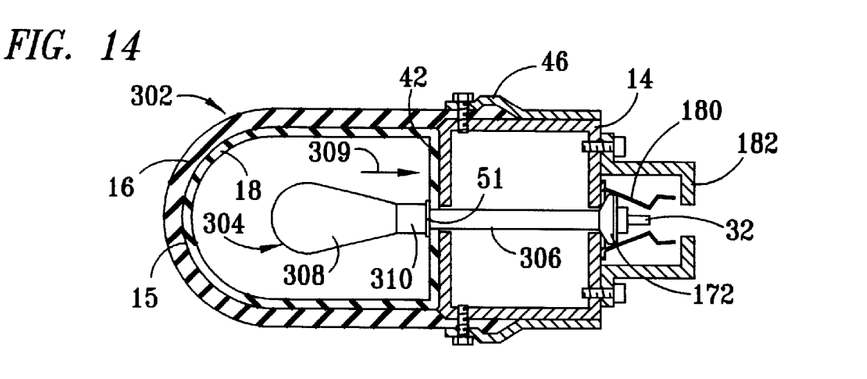
FIG. 14 is a sectional view of the second air bumper, taken along section line 14—14 of FIG. 13, and showing a first impact pressure relief assembly and a first alternative configuration for mounting the inflatable bladder to the bumper frame of the second air bumper.

FIG. 14 is a sectional view of the air bumper 302, taken along section 14—14 of FIG. 13. The impact release unit 304 is shown disposed within the inflatable bladder 16 and mounted to a bumper frame 14. The impact release unit 304 includes a flow tube 306 and an impact member 308. The flow tube 306 includes a stem 310 which extends through the flow tube 306. Preferably, the inflatable bladder includes the interiorly disposed tube 18, and a seal member 51 which seals the tube 18 around the forward end of the flow tube 306. The rearward end of the air bumper 302 includes a shroud 182, and a fluid inlet valve for inflating the impact member 308. A seal member 172 is disposed on the rearward end of the stem 310 for sealingly engaging the flow tube 306. A latch clip 180 is also provided for engaging the seal 172 to retain the impact release unit 304 in an actuated position, to allow air to flow from within the inflatable bladder 16. Upon impact, the impact member 208 is moved in a rearward direction 309, such that the seal 172 will unseat from the rearward end of the frame 14 and allow air to pass through the flow tube 306 and be expended to the atmosphere. The latch clip 180 will retain the seal 172 in a rearward position until being reset by user who will preferably inspect the air bumper 302 for damage prior to continued use.

Figure 15:
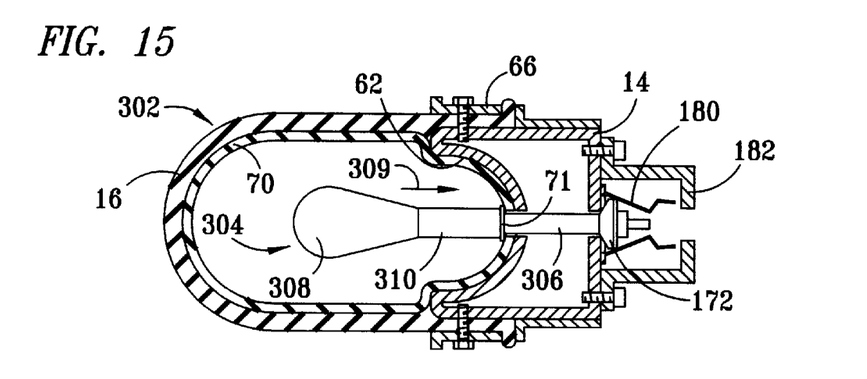
FIG. 15 is a sectional view of the second air bumper taken along section line 14—14 of FIG. 13, showing the first impact pressure relief assembly and a second alternative configuration for mounting the inflatable bladder to the bumper frame.

FIG. 15 is a sectional view of the second air bumper 302, taken along section line 14—14 of FIG. 13, and showing a second alternative configuration for mounting the inflatable bladder 16 to the bumper frame 14. The forward face of the bumper frame 14 has a concave forward surface 62, whereas the forward face of the bumper frame 14 of FIG. 14 has a flat planer forward surface.

Figure 16:
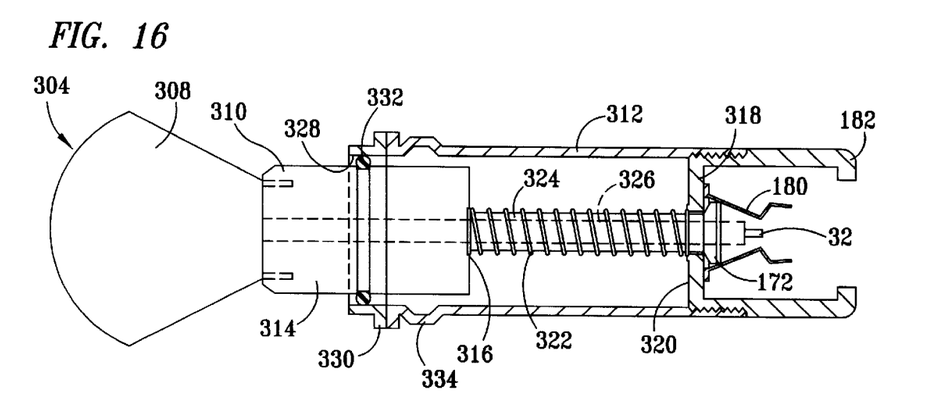
FIG. 16 is a longitudinal section view of a second impact pressure relief assembly, shown in an unactuated state, sealing air within the inflatable bladder.

FIG. 16 is a longitudinal section view of a second impact pressure relief unit 304. The impact release unit 304 includes a flow tube 312. A rearward facing shoulder 316 is defined by the rearward end of the forward member 314, and provides a rearwardly disposed flange 318. A forward facing shoulder 320 is defined by the forward end of a flange 318. A bias member 322 extends between the shoulder 320 and the shoulder 316, and preferably is provided by a coil spring. A shank tube 324 extends through the forward member 314 and through the flange 318. The shank tube 324 has an inflation passage 326 which extends therethrough. An inflation valve 32 is disposed in the rearward and of the shank tube 324, and may be provided by a conventional automotive tire stem valve. An external groove 328 is formed into the exterior of the forward member 314. A seal surface 330 is provided by a forward end of the flow tube 312 and is engaged by a forward seal member 332, which is disposed in the groove 324. The forward seal member 332 is preferably provided by an elastomeric seal, such as an O-ring or a lip seal. Seal bypass 334 is provided by an enlarged diameter portion of the flow tube 312. When pressure is encountered on the forward face of the impact member 308, the forward member 314 will be moved rearward against the force of the bias member 322 until the forward seal 332 is disposed within the seal bypass 334, and the seal member 172 will unseat from sealing against the flange 318, allowing air to flow from within the interior of the air bumper 302, and preferably to atmosphere.

Figure 17:
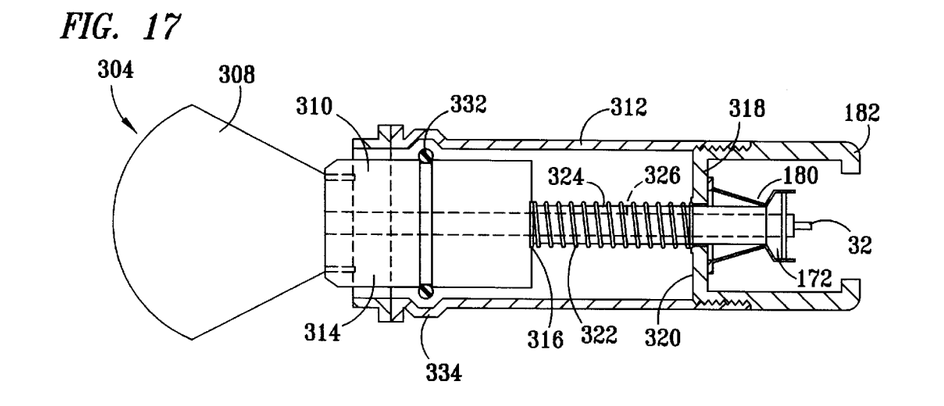
FIG. 17 is a longitudinal section view of the second impact pressure relief assembly, shown in an actuated state for releasing air from within the inflatable bladder of the air bumper.

FIG. 17 is a longitudinal section view showing the impact release unit 304 after it has been actuated to an activated state, such that the forward seal member 332 is disposed within the seal bypass region 334, and the rearward seal 172 is retained by the latch clip 180 in a rearward position. After a post impact inspection, the latch clip 180 is pushed outward to release the seal member 172 and allow the bias member 322 to urge the forward member 314 to a forward position, with the seal 332 engaged between the seal surface 330 and the groove 328 of the forward member 314, and the seal member 172 sealingly engaging the flange 318. Then, the inflatable bladder 16 may be reinflated for use after inspection for damage or deterioration from prior use.

Figure 18:
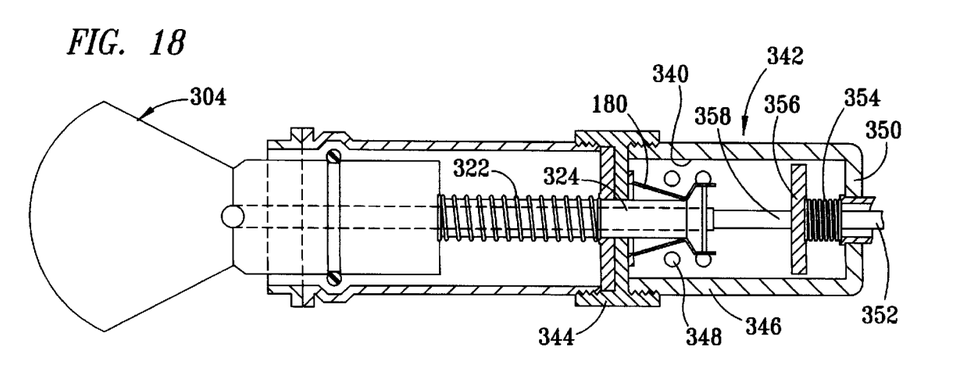
FIG. 18 is a longitudinal section view of a third impact pressure relief assembly, having an actuator assembly and adapter mounted to an inward end thereof.

FIG. 18 is a longitudinal section view of an impact release unit 304 having an activator adaptor 342 mounted to the rearward end thereof. The impact release unit 304 is shown in an actuated position, after an impact. The activator adaptor 342 may be utilized for activating other safety devices, such as, for example, an inflatable air bag within the passenger cabin of an automobile. The activator adaptor 342 includes an adaptor coupling 344 which includes a tubular sleeve 346. Fluid flow ports 348 extend radially through the sleeve 346 to provide fluid communication between the interior of the sleeve 346 and the exterior thereof. Air released from within the inflatable bladder 16 will pass through the impact pressure relief unit 304 and into the sleeve 346, then outwardly through the fluid flow ports 348 to atmosphere. A rearward retainer flange 350 is provided on the rearward-most end of the sleeve 346. An actuator member 352 extends through the rearward flange 350 for actuating a device (not shown) to which the activator adaptor 342 is connected. A bias member 354, which is preferably a coil spring, extends around the forward end of the actuator member 352 and engages a forward end flange 356. The shank tube 324 has a rearward end tip 358. Upon actuation of the impact release unit 304 to release air from within the inflatable bladder 16, the tip 358 of the shank 324 will engage the end flange 356, pushing the end flange 356 against the bias member 354. If the impact of the collision is of a sufficient energy level, then the bias member 354 will be compressed between the end flange 356 and the rearward flange 350 of the sleeve 346. This will urge the actuator member 352 rearward, actuating a connected device, such as an inflatable air bag release within the interior cab of the vehicle. Upon release of the latch clip 180, which may be released by inserting a tool through the fluid flow ports 348, the bias member 322 will urge the impact member 308 and shank 324 forward, releasing the tip 358 from pressing against the end flange 356. This will allow the bias member 354 to press between the end flange 350 and the rearward flange 356, urging the actuator member 352 forward from an actuated state to an unactuated, or released, state.

Figure 19:
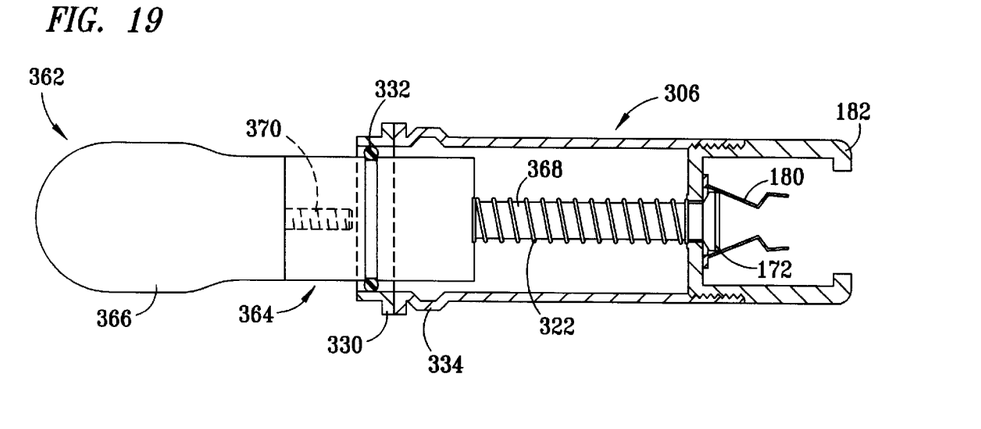
FIG. 19 is a longitudinal sectional view of a fourth impact pressure relief assembly, shown in an unactuated state, sealing air within the inflatable bladder of the air bumper.
Figure 20:
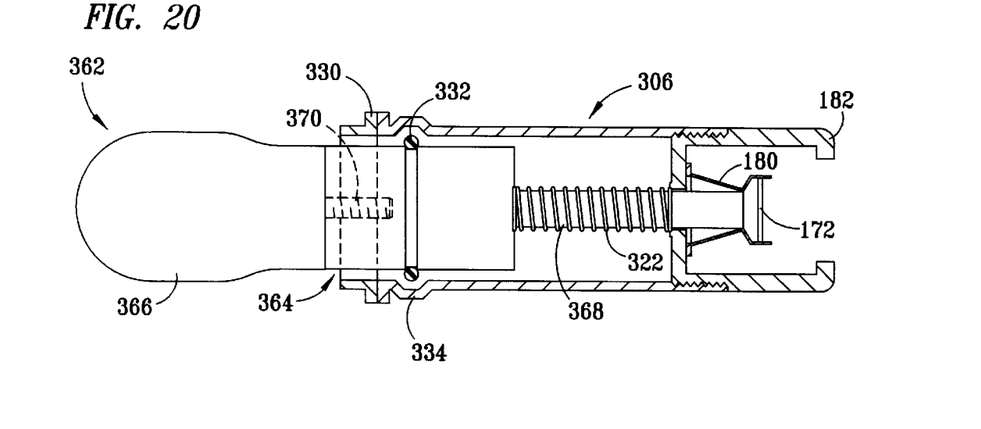
FIG. 20 is a longitudinal section view of the fourth impact pressure relief assembly, shown in an actuated state to release air from within the inflatable bladder.

FIGS. 19 and 20 are longitudinal section views of a fourth impact release unit 362 in a non-actuated state and in an actuated state, respectively. A solid stem 368 connects to a solid impact member 366. The impact member 366 is preferably formed of solid rubber. The shank 368 is preferably a solid rod. A threaded coupling member 370 secures the impact member 366 to the stem 364. Other components of the alternative impact release unit 362 are similar to those above for the impact release unit 304.

Although air is used as a fluid for inflating the inflatable bladder 16 of the present invention, other fluids, preferably compressible fluids, may likewise be used. In other embodiments, the outer bladder member 15 may be provided by a single inflatable element having a self-contained inflatable bladder, without requiring an interiorly disposed tube, such as tube 18, which is separate from the outer bladder member 15. An inflatable bladder 16 may also be provided in other embodiments by the sealing the outer bladder member 15 to the bumper frame 14, without requiring an interiorly disposed tube, such as tube 18. Additionally, although reference herein is made to forward and rearward directions, such references are used herein to indicate inward and outward directions, respectively, in terms of a forwardly disposed and rearwardly disposed portion of the bumper relative to the bumper frame, and not to limit the invention to a forwardly disposed bumper in relation to a vehicle, a vessel, a guard rail, or the like. Further, a mixture of the types of pressure relief valves and inlet may be selected for use in a bumper made according to the present invention. Additionally, pressure relief valves having multiple pressure relief set points may be used.

The air bumper of the present invention provides several advantages over the prior art air bumpers. The air bumper of the present invention may be used for vehicles, such as automobiles, boats, and other moving vehicles, or stationary guard rails and the like, to absorb the impact of collisions. On air bumper of the present invention includes impact pressure release units which will release air from within the inflatable bladder upon impact. The fluid release units of the inflatable bladder of the present invention may be selected such that they operate at different set points for the same bumper, such as for both an intermediate pressure level and a high pressure level. Such an air bumper will operate to release air in two stages, one being an intermediate pressure fluid release and the other being a high pressure fluid release for absorbing impacts from collisions of various energy levels. The high pressure fluid release valves of the present invention are latched open or remain open after a large impact, which creates pressures which exceed a preselected maximum pressure, such that the air valves must be accessed and preferably inspected to determine whether the air bumper of the present invention has been damaged prior to resetting the release portions for continued use of the air bumper. Once inspected, the pressure relief valves may be manually reset such that the air bumper may be again used. In an alternative embodiment, the lower pressure release valves will be self-resetting such that the bumper may be reinflated for continued use without requiring further maintenance, other than to repressurize the inflatable bladder.

Although the preferred embodiment has been described in detail, it should be understood that various changes, substitutions and alterations can be made therein without departing from the spirit and scope of the invention as defined by the appended claims.

What is claimed is:

1. In a bumper having a bumper frame, a fluid bladder secured to said bumper frame such that at least a portion of said fluid bladder extends exteriorly of said bumper frame, said fluid bladder having a fluid disposed therein, a fluid flow port extending from an interior of said fluid bladder to exteriorly of said fluid bladder, and a seal assembly mounted to said bumper, said seal assembly having a seal member which is disposed in a closed position to sealingly engage said fluid flow port to seal said fluid within said fluid bladder, said seal assembly further having a bias member for urging said seal member into said closed position to sealing engage said fluid flow port to seal said fluid within said fluid bladder until an impact of a predetermined magnitude urges said seal member to move from said closed position to an open position, in which fluid is released from within said fluid bladder, the improvement comprising:

a latch member extending adjacent of said seal assembly and securing said seal member in said open position when said seal member is disposed in said open position, such that said seal member is disengaged from sealingly engaging said fluid flow port to release said fluid from within said fluid bladder, and wherein said latch member is selectively operable for releasing said seal assembly to return to said closed position, sealing engaging said fluid flow port.

2. The bumper according to claim 1, wherein said latch member comprises an annular shaped base having a central orifice and at least two spring arms which extend rearward and closer together from said annular shaped base to define a narrowly spaced apart region between said spring arms, which is spaced apart from said base, such that said two spring arms engage said seal assembly to secure said seal assembly into said open position when said seal member is disposed in said open position.

3. The bumper according to claim 2, wherein said seal assembly comprises a shaft which extends through said flow port, said shaft having an inward end to which said seal member is secured, inward of said bumper frame.

4. The bumper according to claim 3, further comprising an activator assembly, having an activator shaft with a forward portion which is aligned with an end portion of said shaft of said seal assembly, such that movement of said shaft of said seal assembly and said seal member from said closed position to said open position moves said activator shaft from a first position to a second position; and an activator bias member for urging said activator shaft to return from said second position to said first position in response to said shaft of said seal assembly moving with said seal member from said open position to said closed position.

5. The bumper according to claim 3, wherein an annular shaped lip seal is secured to an outward end of said shaft, for sealingly engaging an interiorly disposed sealing surface defined by said flow port.

6. The bumper according to claim 5, wherein said fluid bladder comprises an elastomeric outward portion and an inward portion, said inward portion being defined by said bumper frame and said elastomeric outward portion sealingly engaging said bumper frame to define a fluid chamber of said fluid bladder therebetween.

7. The bumper according to claim 1, further comprising an impact member connected to said seal assembly and extending in said fluid bladder, spaced apart from an outward portion of said fluid bladder, such that said impact member engages said outward portion and moves inward during an impact exceeding a selected magnitude to urge said sealing assembly to move against the force of said biasing member to disengage said sealing member from sealingly engaging said fluid flow port to release fluid from within said fluid bladder.

8. The bumper according to claim 7, wherein said impact member comprises one of an inflatable element and a solid rubber element.

9. The bumper according to claim 8, wherein said seal assembly comprises a shaft which extends through said flow port, said shaft having an end to which said seal member is secured for sealingly engaging said flow port, and wherein said bumper further comprises:

an activator assembly, having an activator shaft with a forward portion which is aligned with an end portion of said shaft of said seal assembly, such that movement of said impact member urges movement of said shaft of said seal assembly and said seal member from said closed position to said open position, and moves said activator shaft to from a first position to a second position; and an activator bias member for urging said activator shaft to return from said second position to said first position when said shaft of said seal assembly is moved with said seal member from said open position to said closed position.

10. The bumper according to claim 1, wherein said fluid flow port comprises a tubular passage, and said seal member comprises a plug having a plug body, one of said tubular passage and said plug body having a plurality of grooves formed to circumferentially extending therein for receiving seal elements which sealingly engage the other of said tubular passage and said plug body in a frictional engagement therewith, which at least in part determines said predetermined magnitude of the impact for moving said seal member from said first position to said second position.

11. The bumper according to claim 10, further comprising a tether member secured to said plug body and said bumper frame, and slidably secured to at least one of said plug body and said bumper member.

12. The bumper according to claim 11, wherein said tether member comprises a tether sleeve having an outwardly disposed, annular ring for engaging a retainer member having an annular-shaped collar mounted to said bumper frame.

13. The bumper according to claim 1, further comprising:

said latch member including an annular shaped base having a central orifice and at least two spring arms which extend rearward and closer together from said annular shaped base to define narrowly spaced apart region, spaced apart from said base, such that said two spring arms engage said seal assembly to secure said seal assembly and said seal member into said open position;

said seal assembly having a shaft which extends through said flow port;

said shaft having an inward end to which said seal member is secured, inward of said bumper frame;

an annular shaped lip seal secured to an outward end of said shaft, for sealingly engaging an interiorly disposed sealing surface of said flow port;

said fluid bladder having an elastomeric outward portion and an inward portion, said inward portion being defined by said bumper frame and said elastomeric outward portion sealingly engaging said bumper frame to define a fluid chamber of said fluid bladder therebetween;

an impact member connected to said seal assembly and extending in said fluid bladder, spaced apart from an outward portion of said fluid bladder, such that said impact member engages said outward portion and moves inward during an impact exceeding a selected magnitude to urge said sealing assembly to move against the force of said biasing member to disengage said sealing member from sealingly engaging said fluid flow port to release fluid from within said fluid bladder;

said fluid flow port having a tubular passage, and said seal member having a plug having a plug body, one of said tubular passage and said plug body having a plurality of grooves formed to circumferentially extending therein for receiving seal elements which sealingly engage the other of said tubular passage and said plug body in a frictional engagement therewith, which at least in part determines said predetermined magnitude of the impact for moving said seal member from said first position to said second position; and a tether member secured to said plug body and said bumper frame, and slidably secured to at least one of said plug body and said bumper frame, said tether member comprises a tether sleeve having an outwardly disposed, annular ring for engaging a retainer member having an annular-shaped collar mounted to said bumper frame.

14. A bumper for absorbing an impact of a collision, comprising:

a bumper frame;

a fluid bladder having a fluid disposed therein, said fluid bladder secured to said bumper frame, such that at least a portion of said fluid bladder extends from said bumper frame;

a fluid flow port extending from an interior of said fluid bladder to exteriorly of said fluid bladder;

a seal assembly mounted to said bumper, and including a seal member which is moveable with said seal assembly from an open position to a closed position, wherein said seal member, when disposed in said closed position, sealingly engages said fluid flow port to seal fluid within said fluid bladder, and, when disposed in said open position, is spaced apart from said fluid flow port such that fluid is released from within said fluid bladder;

said seal assembly further including a bias member which extends between said seal assembly and said bumper to urge said seal member into said closed position, sealing engaging said fluid flow port to seal fluid within said fluid bladder; and an impact member connected to said seal assembly and extending in said fluid bladder, spaced apart from an outward portion of said fluid bladder, such that said impact member engages said outward portion and moves inward during an impact exceeding a selected magnitude to urge said sealing assembly to move against the force of said biasing member to disengage said sealing member from sealingly engaging said fluid flow port to release said fluid from within said fluid bladder.

15. The bumper according to claim 14, wherein said impact member comprises one of an inflatable element and a solid rubber element, which extends within said fluid bladder, spaced apart from said outward portion of said fluid bladder prior to impact.

16. The bumper according to claim 14, further comprising a latch member which extends adjacent to said seal assembly and secures said seal member in said open position when said seal member is disposed in said open position, such that said seal member is disengaged from sealingly engaging said fluid flow port to release said fluid from within said fluid bladder, and wherein said latch member is selectively operable for releasing said seal assembly to return to said closed position, sealing engaging said fluid flow port.

17. The bumper according to claim 16, wherein said latch member comprises an annular shaped base having a central orifice and at least two spring arms which extend rearward and closer together from said annular shaped base to define a narrowly spaced apart region between said spring arms, which is spaced apart from said base, such that said two spring arms engage said seal assembly to secure said seal assembly into said open position when said seal member is disposed in said open position.

18. The bumper according to claim 14, further comprising said fluid flow port having a tubular passage, and said seal member having a plug having a plug body, one of said tubular passage and said plug body having a plurality of grooves formed to circumferentially extending therein for receiving seal elements which sealingly engage the other of said tubular passage and said plug body in a frictional engagement therewith, which at least in part determines said predetermined magnitude of the impact for moving said seal member from said first position to said second position; and a tether member secured to said plug body and said bumper frame.

19. The bumper according to claim 18, wherein said tether member comprises a tether sleeve having an outwardly disposed, annular ring for engaging a retainer member having an annular-shaped collar mounted to said bumper frame.

20. The bumper according to claim 14, wherein said seal assembly comprises:

a shaft which extends through said flow port, said shaft having an inward end to which said seal member is secured, inward of said bumper frame; and an annular shaped lip seal secured to an outward end of said shaft, disposed to sealingly engage an interiorly disposed sealing surface of said flow port when said seal assembly is disposed in said closed position.

21. The bumper according to claim 14, wherein said seal assembly comprises a shaft which extends through said flow port, said shaft having an end to which said seal member is secured for sealingly engaging said flow port, and wherein said bumper further comprises:

an activator assembly, having an activator shaft with a forward portion which is aligned with an end portion of said shaft of said seal assembly, such that movement of said shaft of said seal assembly from said closed position to said open position moves said activator shaft to from a first position to a second position; and an activator bias member for urging said activator shaft to return from said second position to said first position when said shaft of said seal assembly is returned from said open position to said closed position.

22. The bumper according to claim 14, wherein said fluid bladder comprises an elastomeric outward portion and an inward portion, said inward portion being defined by said bumper frame and said elastomeric outward portion sealingly engaging said bumper frame to define a fluid chamber of said fluid bladder therebetween.

* * * * *